Sept. 14, 1954  H. A. DROITCOUR ET AL  2,688,977
RELIEF VALVE
Filed Sept. 1, 1951  2 Sheets-Sheet 1
FIG. 1
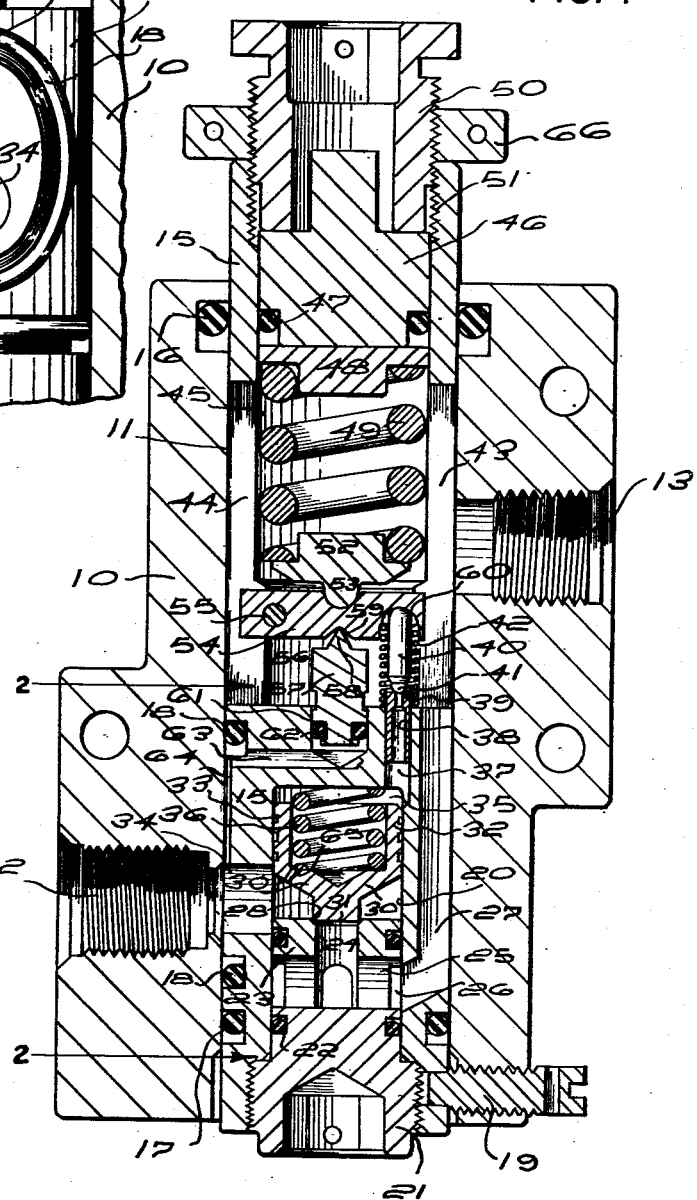
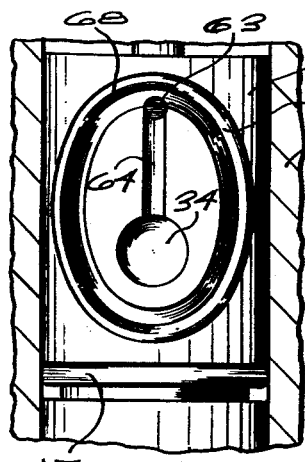
FIG. 2
INVENTORS.
Howard A. Droitcour
BY John M. Droitcour
Barlow & Barlow
ATTORNEYS.

Sept. 14, 1954     H. A. DROITCOUR ET AL     2,688,977
RELIEF VALVE
Filed Sept. 1, 1951                           2 Sheets-Sheet 2

INVENTOR.
Howard A. Droitcour
BY John M. Droitcour
Barlow & Barlow
ATTORNEYS.

Patented Sept. 14, 1954

2,688,977

UNITED STATES PATENT OFFICE 2,688,977

RELIEF VALVE

Howard A. Droitcour, Cranston, and John M. Droitcour, Warwick, R. I.

Application September 1, 1951, Serial No. 244,754

12 Claims. (Cl. 137—491)

1

This invention relates to a relief valve for relieving pressure in a system should the pressure exceed a certain predetermined amount.

Relief valves which are used for controlling relatively high pressures frequently chatter when the pressure of the system is close to the predetermined amount at which the valve will operate, and constructions of a relatively complicated nature are provided for controlling the pressure. Frequently, a pilot valve is used in order that a nicer control may be utilized, and the present invention relates more particularly to the type of valve in which a pilot valve is provided for controlling the main valve.

One of the objects of this invention is to provide a valve which will be so constructed that it is more easily manufactured than valves providing comparable results heretofore made.

Another object of this invention is to reduce the friction of the moving parts which frequently occurs in valves of this character so that the opening may be more sensitive.

Another object of this invention is to transfer movement around rather than through high pressure area.

Another object of this invention is to provide a compact unit.

Another object of this invention is to construct the valve so that concentric alignment of different parts is not critical and a slight misalignment of one part will not affect some other part.

Another object of this invention is to provide a construction in which close machining of the parts for accurate fit is reduced to a minimum.

Another object of this invention is to apply spring pressure without sidewise load or in other words axially or in the direction in which it is desired that movement shall occur.

Another object of this invention is to provide a valve structure in which the movable parts may be removed as a unit from a housing in which they are designed to operate.

With these and other objects in view, the invention consists of certain novel features of construction, as will be more fully described and particularly pointed out in the appended claims.

In the accompanying drawing:

Figure 1 is a sectional view through a valve illustrating the essential parts of this invention;

Figure 2 is a fragmental section on line 2—2 of Figure 1;

2

Figure 3:
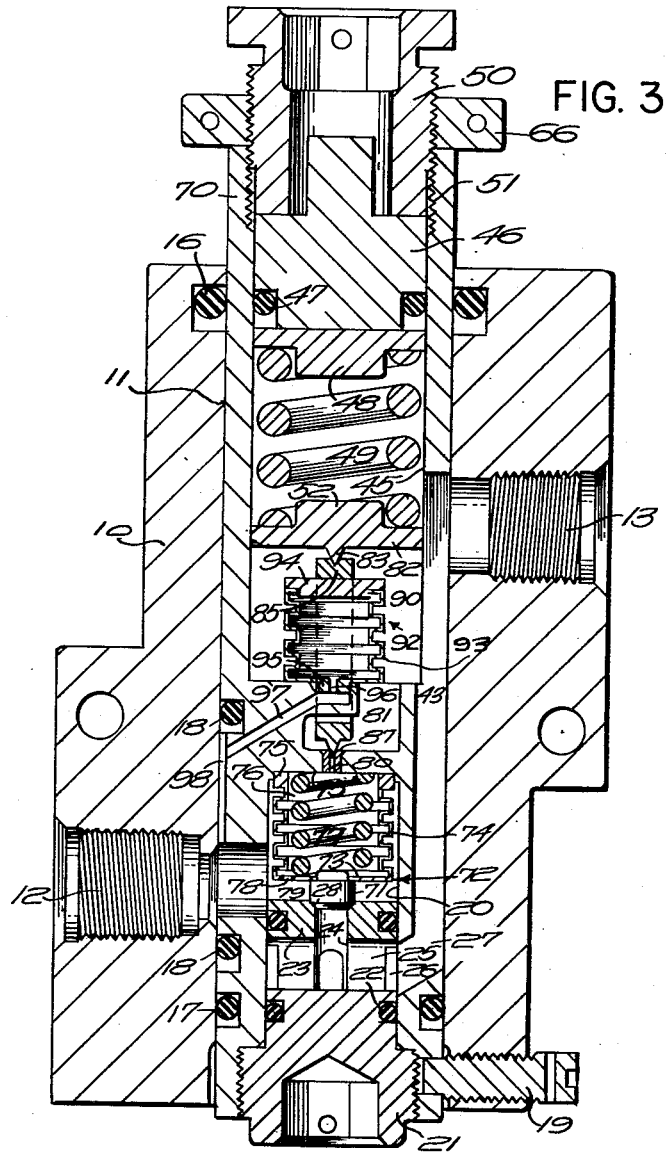
Figure 3 is a view similar to Figure 1 of a modified arrangement.

In proceeding with this invention, we provide a housing having a main plug with a chamber above it into which liquid may enter gradually from the inlet to the housing, and we provide a pilot plug which will open to relieve the pressure in the chamber so that the main plug may be operated by the direct line pressure. We also provide a pilot piston or other movable separator which is subjected to pressure at the inlet side of the housing and utilize a spring acting upon a lever, which lever presses upon the pilot piston and the pilot plug. A single lever may be used as the movement of the pilot plug and the pilot piston are parallel. This arrangement also permits of a slight out of alignment of the main pilot plug or pilot piston without one contributing to the misalignment of the other, and thus reducing the necessity of accurate machining. We also provide an arrangement so that the working parts may be easily removed for inspection, replacement or repair as is desired.

With reference to the drawings, 10 (see Fig. 1) designates a housing or outer body portion of the valve unit in which the working parts are located. This housing has a central cylindrical bore 11 with which the inlet port 12 communicates and from which the exhaust port 13 leads. A removable unit 15 is generally cylindrical and is positioned within the bore 11 and is readily removable therefrom. It has sealed engagement with the bore at its upper end by means of the O ring 16 and sealed engagement at the lower end with the bore by O ring 17. A seal about the inlet 12 is had by O ring 18 encircling this port. A screw 19 through the housing 10 at the lower end serves to hold this removable unit in position in the bore. This unit contains all of the moving parts, and if it is necessary to replace or repair any of these parts, this unit may be removed as a whole from the housing without disturbing the connections at the inlet and exhaust ports.

This unit 15 has a central bore 20 which is closed by a plug 21 and O ring seal 22 at its lower end. A block 23 rests upon this closure 21 and is provided with a central bore 24 with channels 25 leading radially outwardly from this bore in its lower portion to an annular chamber 26 formed by a reduced portion of the block 23 and this annular chamber connects with a recess 27 which forms a part of a conduit to the exhaust port 13. The upper end of the bore 24 in the block 23 provides the main valve seat 28 in the path between the inlet port 12 and the exhaust port 13. It is beveled as shown.

The main valve plug 30 is slidably received within the bore 20 of unit 15 and has a reduced portion 31 with corners lapped to engage the beveled seat 28, while its upper end forms a separator which in Figure 1 is shown as a piston 32 with recesses 33 along its side and is of such size as to permit some leakage from the inlet port through opening 34 in the unit 15 to the chamber 35 above the main valve plug. This main valve plug piston is recessed from its upper end to receive a spring 36 which bears against the piston and the upper end of the chamber 35 so as to urge the plug downwardly. A control port 37 leads from this chamber 35 and is provided with a bushing 38, the upper end of which has a valve seat 39 to be engaged by the pilot valve plug 40 which is shaped at its end 41 to form a seal with the seat 39 when located on this seat. The coil of wire 42 encircles this plug and serves as a guide for it. When this pilot plug is lifted from its seat 39, fluid may pass through the control port 37 and through the slot 43 to the exhaust port 13. The upper part of the unit 15 is provided with a bore 45, while slots 43 and 44 extend radially outwardly from the bore.

A block 46 is slidably located in the bore 45 and is sealed with an O ring 47 between it and the bore 45. This block has an abutment with a boss 48 beneath it for engagement with a spring 49. The position of this block may be adjusted to vary the tension on the spring by screw 50 which has threaded engagement as at 51 with the bore 45 so that as this screw is turned downwardly, the block is slid inwardly to increase the tension on the spring. Nut 66 has threaded engagement with the screw to abut the unit 15 to lock the screw in place. This spring 49 engages a boss 52 at its lower end which transmits pressure through the curved projection 53 to a lever 54 pivoted as at 55 in the slot 44 and urged downwardly by this spring 49. In a space 56 beneath the lever there is located a movable pilot separator which in Figure 1 is shown as a piston 57 which has a conical point 58 engaging a recess 59 under the lever, while the lever is also recessed as at 60 to engage the curved upper end of the pilot valve plug 40. This piston 57 is slidably guided in a smaller bore 61 and is sealed by means of the O ring 62. This bore 61 has communication through the conduits 63 and 64 with the opening 34 and inlet port 12. The O ring is elastic and the piston 57 has so little movement that the O ring does not slide, thus the piston becomes essentially a yieldable separator which is elastically mounted and produces a minimum of friction in the small movement which occurs in its operation.

From the above it will appear that the inlet port pressure is transmitted directly to the pilot separator or piston 57 through the conduits 64, 63, while it is transmitted along the sides of the piston and through the restricted orifice 65 in the separator 32 to the pilot valve plug 40, both of which engage the lever 54 and are balanced by the spring 49, which spring may be adjusted so that the main valve 31 will open at any desired pressure. Assuming that the pressure at the inlet port 12 increases beyond that at which the valve was set to release it, then the piston 57 and the pilot valve 40 will move upwardly against the action of the spring 49 and as the pilot valve 40 comes unseated, the fluid in the chamber 35 will be permitted to drain from the chamber to the exhaust port, relieving enough pressure above the main valve 31 so that the pressure at the inlet port will then open the main valve 31 against its spring 36 and there will be a flow through the bore 24, channels 25, 26, 27 and 43 to the exhaust port.

As all of the plugs and pistons are individual, close tolerances in machining are permitted and slight out of alignment of the pilot piston 57 and pilot valve 40 will not materially affect the operation of the valve, making multiple production much simpler. Concentric alignments of the seats and plugs are, therefore, minimized. The arrangement also is such that there is a minimum amount of friction of the moving parts such as the valve plugs, which is also highly desirable in close opening and closing operation.

In some cases instead of using a unit 15 as heretofore described, a unit 70 as shown in Figure 3 may be inserted in the bore 11. It has sealed engagement with this bore by O rings 16, 17, and 18, and is locked in place by the screw 19, as previously described. The unit has a central bore 20 at its lower end which is closed by a plug 21 and O ring seal 22 with a block 23 resting upon the closure and provided with a central bore 24 and channels 25 leading radially therefrom to an annular chamber 26 which connects with the recess 27 forming a conduit to the exhaust port 13 in the same manner as described in connection with the unit 15. The upper end of the bore 24 of the block 23 is beveled and provides a seat 28 for the main valve, being along the conduit between the inlet port 12 and the exhaust port 13.

In the modification shown in Figure 3, the main valve plug 71 is connected to a separator designated generally 72 and here shown in the form of a bellows having an end wall 73 to which the plug 71 is connected and an accordion wall 74 which is secured at its upper end 75 to the end wall 75' of the bore 20. This accordion wall 74 is sufficiently resilient so as to flex and permit the plug 71 which engages the beveled seat 28 to lift off of this seat and thus yieldably mounts the separator between a high pressure on the side of the separator 73 nearest the valve seat and a lower pressure in the chamber 76 within the bellows. A spring 77 serves to urge the wall 73 and the plug 71 carried thereby to close upon the seat 28. A small orifice 78 permits movement of liquid from the area 79 into the chamber 76 in a restricted flow.

A control port 80 leads from the chamber 76 into a recess 81 joining the bore 45 which extends from the other end of the unit 15, as was described in connection with the unit 15 in the construction present in Figure 1, and in the bore 45 we have many parts the same as in the unit 15 above described; thus, there is present block 46, a screw 50 in threads 51 with a locking nut 66, the block 46 being sealed by an O ring 47 and engaging the member 48 which has a boss extending therefrom to center the spring 49, the lower end of which spring engages the boss 52 of member 82 having a projection 83 extending therefrom.

Figure 4:
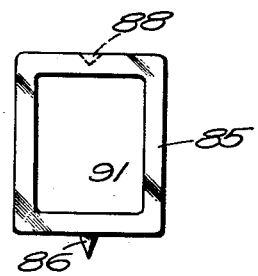
Figure 4 is an elevation of the yoke of Figure 3.

A yoke 85 (see Fig. 4) is provided with a plug 86 to engage the beveled edge 87 of the relief port 80 while it is recessed as at 88 on its upper edge to receive the projection 83 of the member 82 which is urged by spring 49.

This yoke 85 is located in a low pressure area 90 which has communication through the radial opening 43 with the exhaust port 13 and would be forced by the spring 49 to close the control port 80. However, within the opening 91 of the yoke 85 we provide a bellows 92 communicating with the high pressure and serving to provide a separator between the high pressure within the bellows and the low pressure area 90 outside of the bellows. The bellows thus acts as a separator having a circular accordion wall 93 and upper end wall 94 closing the accordion wall and a lower wall 95 the latter communicating by means of passage 96 through the end wall, passage 97 through the unit 70 and 98 along the side of the unit 70 to the inlet port 12 or chamber 79 connecting therewith.

From the above it will appear that the inlet pressure is transmitted directly to the pilot separator or bellows 92 which will be set by reason of the pressure of spring 49 to lift at a predetermined value. When this value is exceeded, the bellows 92 will lift the yoke 85, opening the control port 80 enough to relieve the pressure on the separator 72, thus permitting the pressure on the high pressure side to lift plug 71 and exhaust sufficient from the inlet side 12 to the exhaust 13 to relieve the greater pressure which may have existed and then to return by reason of the springs to the closed condition.

We claim:

1. In a relief valve, a housing having an inlet port and an exhaust port, with a conduit for fluid connecting said ports, a valve seat along said conduit, a main plug engaging said seat to control the flow of fluid through the conduit, a chamber, movable means of greater area than said plug connected to said plug, said means separating the inlet port pressure from pressure in said chamber, a restricted fluid passage from the inlet port to the chamber, a control port for venting the chamber, a valve seat located along said control port, a pilot valve plug engaging said control port seat to control the flow of fluid through the port, said plug urged by chamber pressure to open, a movable pilot separator separating inlet port pressure from the exhaust port pressure, means engaging said pilot separator and pilot valve plug, spring means urging said engaging means to cause the pilot plug to seat against chamber pressure, said spring means being of a force to be overcome by a predetermined pressure at the inlet port acting on the separator whereby the pilot plug and in turn the main plug will be urged to open by pressure acting thereon.

2. In a relief valve as in claim 1, in which said pilot separator is yieldably sealed.

3. In a relief valve as in claim 1, in which the movable means connected to the main plug is a piston.

4. In a relief valve as in claim 1, in which the pilot separator is a piston.

5. In a relief valve as in claim 1, in which the pilot separator is a piston sealed with a resilient packing.

6. In a relief valve as in claim 1, in which the movable means connected to the main plug is a bellows.

7. In a relief valve as in claim 1, in which the pilot separator is a bellows.

8. In a relief valve as in claim 1 wherein the restricted passage from the inlet port to the chamber is along the side of the movable means between them.

9. In a relief valve as in claim 1 wherein the restricted passage from the inlet port to the chamber is through the movable means between them.

10. In a relief valve as in claim 1 wherein the upper portion of the plug is a piston forming one wall of the chamber.

11. In a relief valve as in claim 1, in which the pilot separator is a piston and the means engaging said piston and said pilot plug is exposed to exhaust port pressure only.

12. In a relief valve as in claim 1, in which the means engaging the pilot separator and the pilot plug is exposed to the exhaust port pressure only.

References Cited in the file of this patent

UNITED STATES PATENTS

| Number | Name | Date |
|--------|------|------|
| 272,926 | Wilder | Feb. 27, 1883 |
| 737,985 | White | Sept. 1, 1903 |
| 2,091,596 | Kluppel | Aug. 31, 1937 |